Sept. 15, 1959 F. SILBERHOLZ 2,904,623

HOME COPY SUPPRESSOR UNIT

Filed April 22, 1957

INVENTOR.

FRANK SILBERHOLZ

BY

Walter G. Finch

ATTORNEY

United States Patent Office 2,904,623
Patented Sept. 15, 1959

2,904,623

HOME COPY SUPPRESSOR UNIT

Frank Silberholz, Baltimore, Md.

Application April 22, 1957, Serial No. 654,351
6 Claims. (Cl. 178—2)

The present invention relates in general to wire telegraphy and, more particularly, to a means for suppressing the operation of a home station copy or monitoring teleprinter.

Frequently in teletypewriter systems it is desired to prevent the local or home teleprinter receiving unit from copying a transmitted message or to prevent the operation of a local receiving reperforator. In many offices, a monitor teleprinter or reperforator prints copies of all outgoing as well as incoming messages without regard for the pertinence of the information at the location of the monitor. That is, a local station may be said to include all telegraph equipment within a certain district, say, for example, the city of Baltimore, while within the city a transmitting and receiving unit may be located at one address, with a monitor printer located at what might be a city central office. In an office there is located a receiving printer and a monitor printer. It is desirable to eliminate from the receiving printer, all messages being transmitted for they are being copied by the monitor printer from this office. All incoming messages are copied by the receiving printer as well as the monitor printer. The receiving printer, therefore, has only incoming messages copied thereon, with the outgoing messages being eliminated by the home copy suppressor unit comprising this invention.

Accordingly, it is an object of the present invention to provide a suppressor unit for preventing the operation of a receiving teleprinter or reperforator unit thereby to prevent undue wear on equipment and waste of materials.

It is a further object of the invention to provide a home copy suppressor unit for preventing the local operation of a receiving teleprinter or reperforator but which nevertheless permits the suppressor units to remain alert for incoming messages.

An additional object of the present invention is to provide a suppressor unit capable of performing the aforementioned functions and which is further characterized by its simplicity and reliability of operation.

Other objects and many of the attendant advantages of this invention will become evident as an understanding of the invention is gained through study of the following detailed description and the accompanying drawings, wherein.

Figures 1, 2, 3:
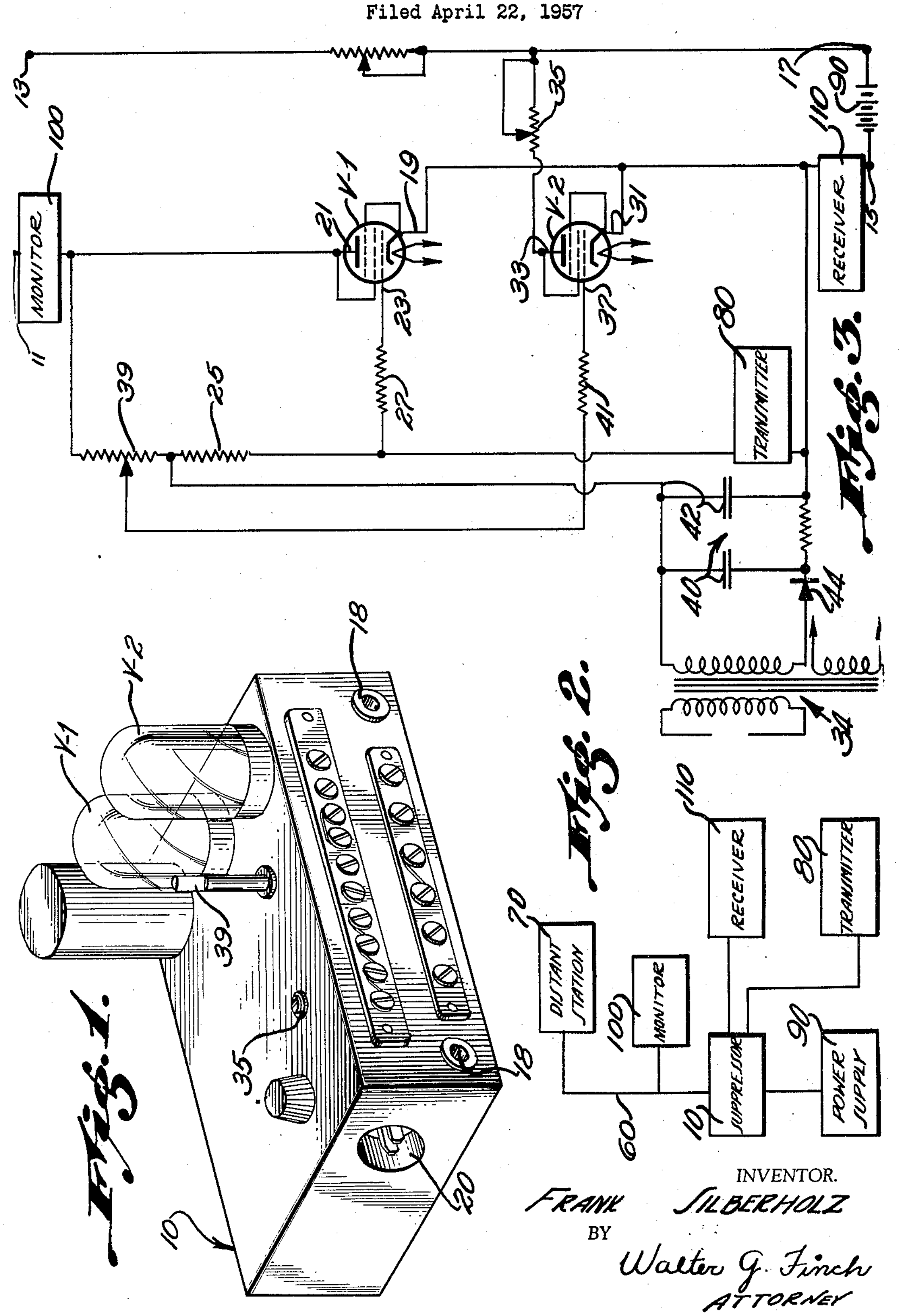
Fig. 1 is a perspective view of the suppressor unit of the present invention.
Fig. 2 is a block diagram of a common telegraph circuit illustrating the location of the suppressor unit in the loop.
Fig. 3 is a schematic circuit diagram of the present invention.

Referring to the drawings, and particularly to Fig. 2, the conventional telegraph circuit includes a local transmitter unit 80 which may comprise a keyboard manual or perforated tape reader and a distant general office receiving unit 70 which may comprise a teleprinter or tape perforator interconnected by telegraph lines 60.

The local station also includes a local receiving teleprinter 110, a monitor printer 100 and a power source 90. Normally the local office receiving unit 110 prints or reperforates tape to copy all messages sent by the local transmitter 80. However, to prevent needless waste and wear, the suppressor unit 10 of the present invention is inserted in the line in position to pass outgoing messages from transmitting unit 80 to the general office receiving unit 70 at a distance station and to pass incoming messages from the general office to the local station receiving unit 110. Outgoing messages are blocked by suppressor unit 10 from actuating local monitor unit 100.

In printing telegraphs employing the Baudot code, normal transmission is by the start-stop method and no explanation of the operation thereof is necessary for an understanding of the present invention beyond the statement that transmission of a character commences with interruption of current flow in the lines.

According to the present invention, means are provided for maintaining current flow to the receiving printer 110 whose operation is to be suppressed during such times as the transmitter causes interruption of the line current.

Referring to the schematic diagram of Fig. 3, the line joining the local station with the distant station is connected to terminals 11 and 13. The power source 90, here represented as a battery, is connected across the line at terminals 15 and 17. At terminal 15 in series with the line joining terminals 11 and 15 is inserted the receiving teleprinter 110.

The monitor 100 is inserted in the line between terminals 11 and 15. A first vacuum tube V–1 is inserted between the receiving teleprinter 110 and monitor 100, with its cathode 19 connected through the receiving teleprinter 110 to the negative terminal of battery 90, and its plate 21 connected through the monitor 100, the line and distant station to terminal 13, the positive side of battery 90.

A bias supply, including a transformer 34, halfwave rectifier 44 and filter circuit 40 provides a negative bias voltage at lead 42 for application to the grid 23 of tube V–1 through resistors 25 and 27. The lower end of resistor 25 is connected through transmitter 80 and the line to cathode 19 of tube V–1. The circuit through transmitter 80 is closed during periods of non-transmission. Thus, the grid 23 of tube V–1 is substantially at zero bias and conduction occurs therethrough.

A second vacuum tube V–2 has its cathode 31 connected to the line at the point of connection of cathode 19 of tube V–1. The plate 22 of tube V–2 is connected through a resistor 35 to terminal 17 and the positive terminal of battery 90. The grid 37 of tube V–2 receives bias from a potentiometer 39 having its lower end connected to bias supply lead 42 and its upper end connected to the line at the point of connection of plate 21 at tube V–1. A resistor 41 limits grid current during conduction of tube V–2. With tube V–1 conducting, the grid bias of tube V–2 is adjusted so that tube V–2 will be non-conductive by a narrow margin.

The operation of the suppressor unit 10 can now be explained. Tube V–1 is conductive during periods of non-transmission, due to the closed circuit through transmitter 80, and tube V–2 is cut off. Upon transmission, that is, opening of the circuit through transmitter 80, current no longer flows through resistor 25 and a large negative bias is applied to the grid of tube V–1 thereby rendering tube V–1 non-conductive. The cut-off of tube V–1 interrupts line current and signals to distant station that a character is to be sent. It is desired, however, that current be maintained through receiving teleprinter 110, and such action is accomplished by the operation of tube V–2. With the cut off of tube V–1, the voltage at the plate 21 of tube V–1 rises and thereby raises the voltage at the upper end of potentiometer 39. The corresponding rise in voltage at grid 37 of tube V–2 is sufficient to render tube V–2 conductive and thereby maintain current flow through receiving teleprinter 110.

Incoming messages commence with the opening of the line at the distant station. Opening the line at the distant station removes the plate voltage from tube V–1 and interrupts current flow through monitor 100 and receiving teleprinter 110. V–2 remains non-conductive since the source of plate voltage of tube V–1 is removed and the voltage at the upper end of potentiometer 39 is no longer raised. Both units 100 and 110 will accordingly print incoming received characters.

As shown in Fig. 1, the invention may be compactly packaged for convenient installation. A.C. power for transformer 14 is supplied through a plug 20. Resister 35 and potentiometer 39 are readily available for adjustment, while connections to the various teleprinter or transmitter units can be made through jacks 18 or terminal strips 12.

Obviously the invention may be practiced otherwise than as specifically disclosed, and many modifications and variations of the present invention are possible in light of the above teachings. It is, therefore, to be understood that within the scope of the appended claims the invention may be practiced otherwise than as specifically described.

What is claimed is:

1. In a telegraph circuit including a transmitting unit, a receiving unit, a power source, and a monitor unit; a suppressor for suppressing the operation of the receiving unit upon transmission by the transmitter, comprising, a first vacuum tube connected in series with said monitor, the telegraph line and the power source for supplying current to the line, a second vacuum tube connected from the power source to the receiving unit to be suppressed, a source of bias voltage, means including the transmitting unit for connecting said bias source with said first vacuum tube to render said first vacuum tube non-conductive upon transmission by said transmitting unit, and means sensitive to the conduction of said first vacuum tube to render said second vacuum tube conductive upon non-conduction of said first vacuum tube.

2. A suppressor unit as claimed in claim 1 wherein said means sensitive to the conduction of said first vacuum tube comprises a potentiometer having one of its ends connected to said source of bias voltage, its other end connected to the plate of said first vacuum tube and its adjustable arm connected to the grid of said second vacuum tube.

3. In a telegraph circuit including a transmitting unit, a local receiving unit, a local monitoring unit, and a power source, said receiving unit and said monitoring unit normally being connected in series with said power source, means for suppressing the operation of said receiving unit upon transmission by said transmitting unit, comprising a first vacuum tube including plate, cathode and grid electrodes interposed in the series line between said local receiving unit and said local monitoring unit, means biasing said first vacuum tube to cut off upon transmission by said transmitting unit, a second vacuum tube including plate, cathode and grid electrodes, said second vacuum tube being connected from said power source to said receiving unit, and means rending said second vacuum tube conductive upon cut off of said first vacuum tube.

4. Suppressing means as claimed in claim 3, wherein said last named means includes a potentiometer having an adjustable voltage tap and a pair of fixed end connections, one of said end connections being secured to the plate of said first vacuum tube, said adjustable voltage tap being connected to the grid of said second vacuum tube.

5. Apparatus as claimed in claim 4 wherein the other of said potentiometer end connections is secured to said first tube biasing means.

6. Apparatus as claimed in claim 5 with additionally a resistor connected from said first tube biasing means to said transmitting unit, and a connection from said transmitting unit to the cathode of said first vacuum tube whereby a closed circuit through said transmitting unit renders said first tube conductive.

References Cited in the file of this patent

UNITED STATES PATENTS 2,795,645 Thienemann ____________ June 11, 1957